United States Patent [19]
Bhat et al.

[11] Patent Number: 5,802,577
[45] Date of Patent: Sep. 1, 1998

[54] MULTI-PROCESSING CACHE COHERENCY PROTOCOL ON A LOCAL BUS

[75] Inventors: Ketan S. Bhat, Mountain View; Gregory S. Mathews, Santa Clara, both of Calif.

[73] Assignee: Intel Corporation, Santa Clara, Calif.

[21] Appl. No.: 856,045

[22] Filed: May 14, 1997

Related U.S. Application Data

[63] Continuation of Ser. No. 762,304, Dec. 9, 1996, abandoned, which is a continuation of Ser. No. 406,153, Mar. 17, 1995, abandoned.

[51] Int. Cl.$^6$ .................................................. G06F 13/36
[52] U.S. Cl. ........................... 711/146; 711/143; 711/120
[58] Field of Search .................................. 711/141, 143, 711/146, 124, 120, 158, 119

[56] References Cited

U.S. PATENT DOCUMENTS

| | | | |
|---|---|---|---|
| 4,755,930 | 7/1988 | Wilson, Jr. et al. | 364/200 |
| 5,293,603 | 3/1994 | MacWilliams et al. | 395/425 |
| 5,301,298 | 4/1994 | Kagan | 395/468 |
| 5,355,467 | 10/1994 | MacWilliams | 395/473 |
| 5,426,765 | 6/1995 | Stevens | 395/485 |
| 5,485,592 | 1/1996 | Lau | 395/470 |

OTHER PUBLICATIONS

"PCI Local Bus Specification, Revision 2.0", Intel Corporation, Apr. 30, 1993.

Computer Architecture A Quantitative Approach, ISBN 1-55860-069-8, pp. 582-585, Patterson, D, Hennessy, J.

Optimizing Systems Performance Based On Pentium Processors, COMPCON Spring 1993 IEEE Computer Society Int'l Conference.

The Cache Memory Book, Jim Handy ISBN 0-12-322985-5.

Pentium Extends 480 bus to 64 Bits, Higher Frequencies, New Features Improve Performance, Microprocessor Report, v.7, n.5, p 10.

*Primary Examiner*—Tod R. Swann
*Assistant Examiner*—Christopher S. Chow
*Attorney, Agent, or Firm*—Blakely, Sokoloff, Taylor & Zafman

[57] ABSTRACT

A computer system maintaining cache coherency among a plurality of caching devices coupled across a local bus includes a bus master, a memory, and a plurality of cache complexes, all coupled to the local bus. When the bus master requests a read or write with the memory, the cache complexes snoop the transaction. Each cache complex asserts a busy signal during the snooping process. A detection circuit detects when the busy signals have been de-asserted and asserts a done signal. If one of the snoops results in a cache hit to a dirty line, the respective cache complex asserts a dirty signal. If one of the snoops results in a cache hit to a clean line, the respective cache complex asserts a clean signal. If the memory detects a simultaneous assertion of the dirty signal and the done signal, it halts the transaction request from the bus master.

12 Claims, 5 Drawing Sheets

MULTI-PROCESSING CACHE COHERENCY PROTOCOL ON A LOCAL BUS

This is a continuation of application Ser. No. 08/762,304, filed Dec. 9, 1996, now abandoned, which is a continuation of application Ser. No. 08/406,153, filed Mar. 17, 1995, now abandoned.

FIELD OF THE INVENTION

The present invention relates to the field of computer buses. More particularly, the present invention relates to a multi-processing cache coherency protocol for use on a local processor bus.

BACKGROUND OF THE INVENTION

In many computer systems, a processor is coupled to an internal or external cache, and possibly an additional external memory device, over a high speed memory bus. This local conglomeration is sometimes termed a processor/cache/memory "complex." (hereinafter denoted as a "cache complex.") FIG. 1 illustrates a prior art computer system containing one such cache complex 140.

Figure 1:
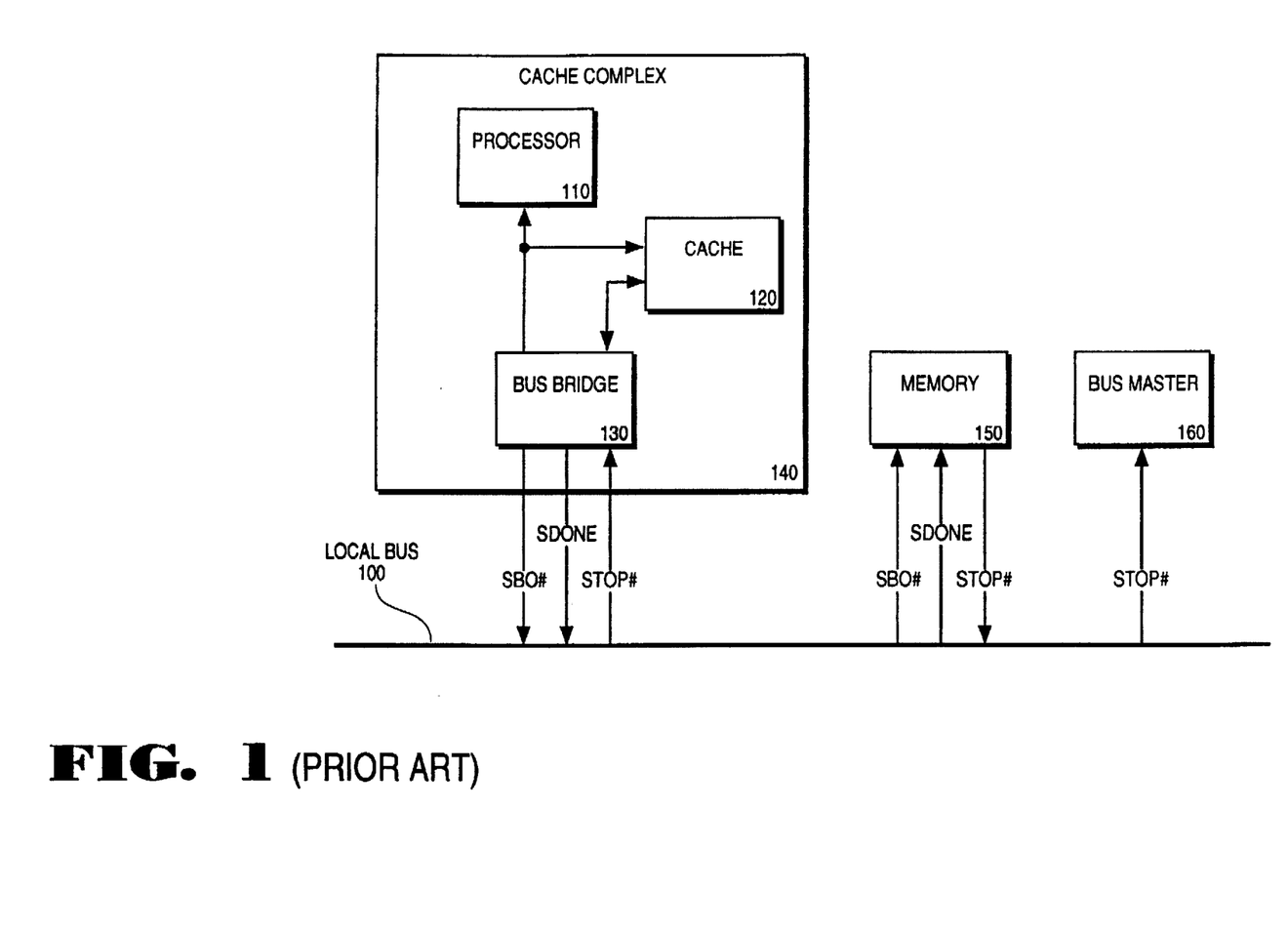
FIG. 1 is a block diagram of a prior art computer system.

The peripheral devices, such as graphics controllers, hard drives, and add-in boards communicate on a local peripheral bus 100, as shown in FIG. 1. A bus bridge 130 may be used to facilitate communication between the local peripheral bus 100 and the processor 110 and cache 120.

In many computer systems, part or all of the system memory may be coupled to the local peripheral bus. In these computer systems, peripheral devices, or "bus agents" request transactions with memory 150 across the local peripheral bus. While the bus agents are initiating a read or write transaction with memory 150, they are referred to as bus masters. One such bus master 160 is displayed in FIG. 1.

When the bus master has initiated a transaction request with the memory, the other cache complexes may monitor, or "snoop," the transaction. This is because a cache complex holds a subset of data elements from the memory that may be altered by the transaction. During the snooping process, the cache complex searches its cache for the data element requested by the bus master.

The cache complex maintains coherency by using one of several well-known protocols. One such protocol is the write-through protocol, where a write cycle always writes through to memory, so that the memory always has the latest copy of the data element. Another protocol is a write-back protocol. The write-back protocol is a deferred writing process where each data element in the cache is assigned an invalid, exclusive, or modified state. The modified state indicates that the data element within the cache is "dirty," or different from (more up to date than) the copy stored in the memory. The exclusive state indicates that the data element within the cache is "clean," or the same as the copy stored in the memory. The invalid state indicates that the data element in the cache has been deallocated. Another embodiment of a deferred writing protocol is sometimes referred to as the "MESI" protocol, where four states are assigned to the data elements within the cache: modified, exclusive, shared, or invalid. Similar to the write-back protocol, the modified state indicates the data element is dirty and the exclusive state indicates the data element is clean. The shared state indicates that the data element is clean, and it is found in more than one cache. These cache coherency protocols and variations thereof are discussed in U.S. Pat. No. 4,755,930.

For one type of bus cache coherency protocol specific to advanced processor systems manufactured by Intel Corporation, three signals are employed. The first signal is asserted by the cache complex when a cache hit to a dirty line occurs. This signal is illustrated as SBO# (Snoop Back Off) in FIG. 1. The second signal is asserted by the cache complex when the cache complex completes snooping. This signal is shown as SDONE (Snoop Done). The third signal is asserted by the memory when the memory witnesses a cache hit to a dirty line. The memory monitors both the SBO# and SDONE signals and when both are asserted concurrently, the memory asserts the third signal, STOP#. The bus master 160 detects the STOP# signal and halts the memory transaction so that the dirty line from the cache 120 can be updated in the memory 150.

One example of a bus protocol employing the above three signals is the Peripheral Component Interconnect (PCI) bus. PCI memory transaction protocol and cache coherency signals are disclosed in the *PCI Local Bus Specification, Rev. 2.0*, published by the PCI Special Interest Group (SIG), Hillsboro, Oreg.

Because SBO#, SDONE, and STOP# are defined for single cache systems, this three-signal protocol is not typically used to communicate between caching processors and system memories in a multi-processing system.

SUMMARY OF THE INVENTION

A computer system employing a protocol for maintaining cache coherency amongst multiple cache complexes coupled across a local bus is described. For one embodiment, the computer system includes a data element stored in a cacheable memory, and a bus master that initiates a transaction request to operate on the data element. A local bus is coupled between the bus master and the cacheable memory for communicating transaction requests from the bus master to the cacheable memory. A plurality of cache complexes are also coupled to the local bus. Each cache complex comprises a cache for storing a subset of data elements from the cacheable memory, cache controlling logic, and a processor.

When the bus master initiates a transaction request, the cache complexes snoop the request and search for the requested data element within their caches. If a first cache complex finds the data element and it is marked dirty, the first cache complex asserts a dirty signal on to the local bus. If the first cache complex finds the data element and it is marked clean, the first cache complex asserts a clean signal on to the local bus. During the snooping of the first cache complex, a first busy signal is asserted. Similarly, a second cache complex asserts second dirty, clean, and busy signals.

A detection circuit monitors the assertion of the first and second busy signals, detects the simultaneous de-assertion of all of the busy signals, and delivers a done signal to the cacheable memory. The cacheable memory detects when there is a simultaneous assertion of the first or second dirty signal and the done signal and subsequently halts the transaction request from the bus master.

Other features, and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A multi-processor local bus cache coherency protocol and implementation for a computer system is described. The cache coherency protocol provides a method by which multiple caching devices coupled to a local bus may maintain coherency during system memory reads and writes.

The cache coherency protocol described below is incorporated in a multi-processor computer system. The computer system includes a local bus coupled to a plurality of caching processors and a system memory device. For one embodiment of the computer system, the local bus is a PCI bus.

Any number of caching processors and system memory devices can be coupled to the local bus. For one embodiment, a caching processor contains an internal cache. For an alternative embodiment, a caching processor is coupled to an external cache.

The computer system and method of employing the cache coherency protocol will be described in more detail herein below.

Figure 2:
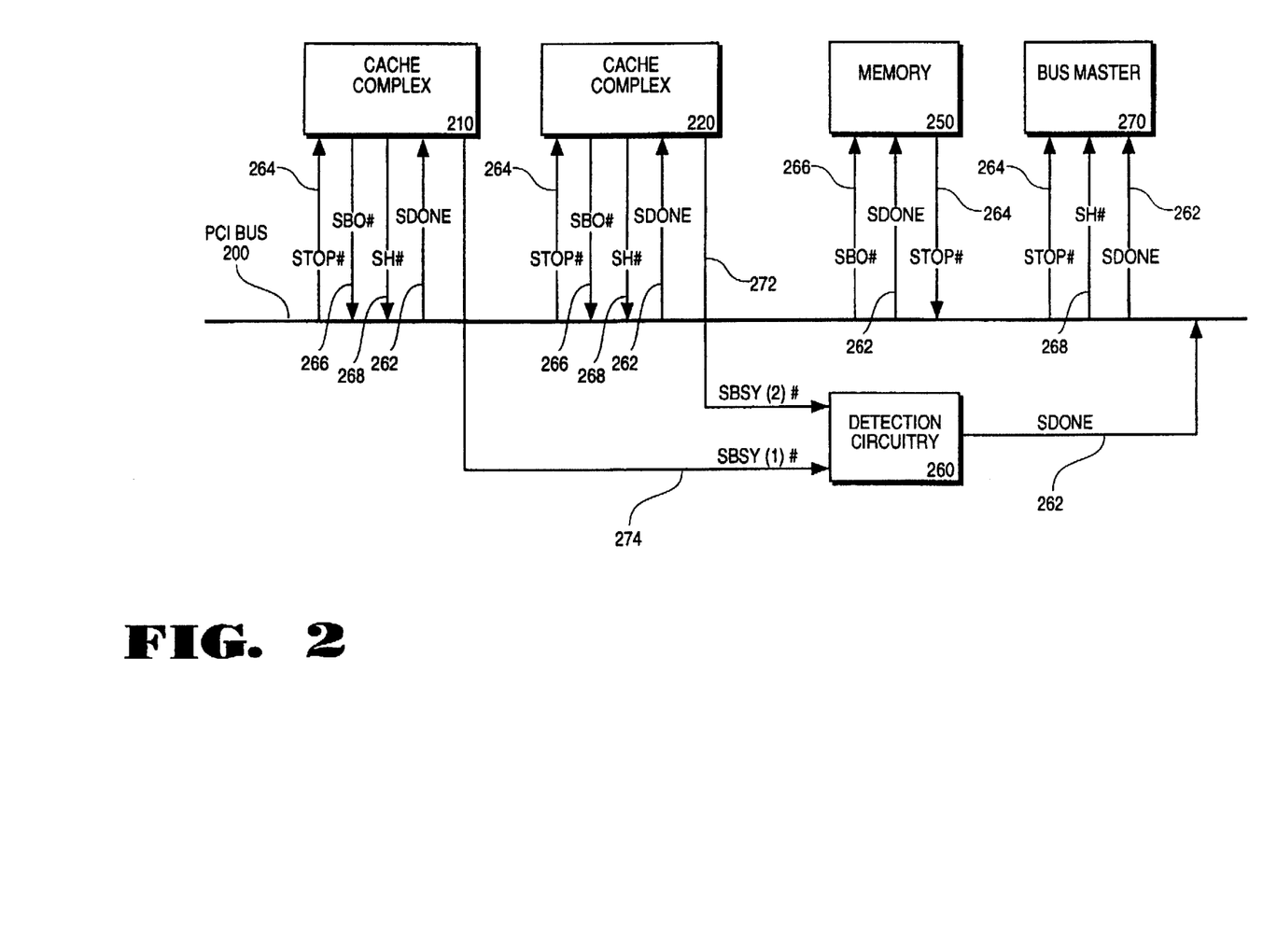
FIG. 2 is a block diagram of a computer system employing a multi-processing cache coherency protocol in accordance with one embodiment of the present invention.

FIG. 2 illustrates a block diagram of one embodiment of a computer system. The system shown in FIG. 2 includes cache complexes 210 and 220 coupled to a PCI bus 200. For one embodiment, the cache complexes 210 and 220 each include a processor coupled to a cache and a PCI bridge, as shown in the cache complex 140 in FIG. 1. Alternative embodiments of the cache complex include dual processors coupled locally to each other with only one interface to the PCI bus 200, a single processor with an internal cache, and simply a cache with a cache controller and PCI interface logic.

For one embodiment of the computer system, the cache within each cache complex 210 and 220 maintains coherency by using the MESI protocol. Alternative embodiments include write-through caches, write-back caches, and write-deferred caches employing various coherency protocols.

The bus master 270 illustrated in FIG. 2 represents any bus agent coupled to the PCI bus 200, capable of initiating a read from or write to memory 250. One embodiment of bus master 270 is a cache complex similar to cache complexes 210 and 220. Alternative embodiments may include processors, graphics controllers, local area network (LAN) controllers, or other peripheral devices capable of processing data stored in memory.

A memory transaction is initiated by the bus master 270 when the bus master 270 desires to operate on a data element stored in the memory 250. The bus master 270 initiates the transaction by asserting an address associated with the data element on to the PCI bus 200. Each of the cache complexes 210 and 220 snoop the transaction by searching for the data element within its cache. From the time the cache complex 210 receives the address to be snooped until it completes its snoop and determines whether or not to indicate a "hit", it asserts an active signal on the SBSY(1)# line 274. Outside this time frame, SBSY(1)# is driven inactive. Similarly, the cache complex 220 asserts an active signal on SBSY(2)# line 272. If either of the cache complexes 210 or 220 contain a copy of the data element, there has been a cache "hit."

When a cache hit results, and the data element within the cache is in the modified state, the cache complex asserts an active signal on line 266 (labeled SBO#). The cache complex must assert the SBO# signal until it detects that the snoop cycle is completed (SDONE is active). For one embodiment of the invention, SBO# 266 is a sustained tristate line. A sustained tristate line must only be driven by one device at a time. The line is first driven to its active state, and then driven to its inactive state for at least one clock cycle. A pull-up enables the line to sustain the inactive value until the line is driven again. Either one of the cache complexes 210 or 220 may assert a signal on to the SBO# 266 line, overriding the sustained value of the line. A cache complex that is not indicating a hit to a modified line will not drive the SBO# 266 line to either the active or inactive state. For another embodiment the SBO# line 266 is a conventional tristate line. Alternative embodiments include other forms of shared signal lines that are designed to be driven by multiple devices. The modified state is defined such that only one cache contains the latest copy of the data element. Therefore, only one cache complex, 210 or 220, asserts a signal on SBO# line 266 during a given transaction.

In another embodiment of the invention, one or more of the cache complexes 210 and 220 employ a write-through cache coherency protocol. Because a write-through cache always contains the latest version of a data element in memory 250, a write-through cache does not drive the SBO# line 266.

Memory 250 is coupled to the PCI bus 200. An embodiment of memory 250 consists of dynamic random access memory (DRAM), and a memory controller for interfacing with the PCI bus. For an alternative embodiment, the memory controller is incorporated with the memory array on the same silicon die. Alternative embodiments of the memory 250 include any known memory design used to store data elements.

The memory 250 senses the assertion of the active signal on SBO# line 266 and on SDONE line 262. Because the SBO# signal 266 is active low, a logical zero (0) indicates that a cache hit to a modified line has occurred. SDONE signal 262 is a logical high signal, so a logical one (1) indicates that the cache complexes 210 and 220 have completed snooping. The following is a table indicating the possible states detected by the memory 250:

TABLE 1

| SDONE | SBO# | State |
|---|---|---|
| 0 | X | standby |
| 1 | 0 | dirty |
| 1 | 1 | clean |

The standby mode indicates that the cache complexes 210 and 220 are currently snooping and have not yet finished. When the memory 250 detects the standby mode, it waits for the snoop results.

The clean state indicates that there is no cache hit to a modified entry and the memory read or write transaction can proceed. The clean state can arise in two different ways. One is when there is not a cache hit in either cache complex 210 or 220. The other is when there is a cache hit in either or both of cache complexes 210 and 220, but the hit data element was not in the modified state. Instead the data element was in one of the clean states; exclusive or shared.

The dirty state indicates that there was a cache hit in one of the cache complexes 210 and 220, and the hit data element is modified, or more recent than the one in memory 250. When the memory 250 detects the dirty state via the SBO# 266 and SDONE 262 signals, it will assert the STOP# signal on line 264. The STOP# signal is detected by the bus master 270, and the memory transaction is halted in order to allow the dirty data element to be written back to the memory 250.

For an embodiment, one or more of cache complexes 210 and 220 use a write-through protocol. Because a write-through cache always has the latest version of the data element kept in memory, there is no reason to halt a memory transaction by asserting STOP# on line 264.

For the embodiment in which the cache complexes 210 and 220 employ a write-back or MESI cache coherency protocol, the cache complexes 210 and 220 may drive the SH# signal on line 268 during memory read operations. If a snoop to one of the cache complexes 210 or 220 results in a hit to a data element in the shared or exclusive state, then the cache complex will assert an active signal on the SH# line 268. For one embodiment, SH# is an active low signal, so a logical zero (0) indicates a cache hit to a shared or exclusive line. There is a possibility that more than one of cache complexes 210 and 220 may have the data element in the shared state, so the SH# line 268 may be driven by more than one source. For one embodiment, the SH# line 268 is a sustained tristate signal, as explained above in reference to the SBO# signal line 266 above. For alternative embodiments, the SH# signal line 268 is implemented using one of the other well-known designs that allow multiple devices to drive a shared signal.

An embodiment of the bus master 270 contains a cache employing a write-back or MESI protocol, and is structured similar to the cache complexes 210 and 220. For this embodiment, the bus master 270 monitors the state of the SH# line 268 during memory read transactions. When the bus master 270 detects an active assertion on the SH# line 268 and SDONE line 262, the bus master 270 knows that the data element being read from memory 250 is also located within at least one cache complex, 210 or 220. The bus master 270 therefore puts the data element into the shared state within its cache when received from the memory 250, or causes the cache complex that has the line to transition to the invalid state. Because the bus master 270 only monitors the SH# line 268 during memory read operations, the ability to drive a signal on the SH# line 268 during memory write operations is optional. Therefore, for an alternative embodiment, a cache complex does assert a signal on SH# 268 during memory write operations.

For one embodiment, the caches contained within the caching complexes 210 and 220 employ a write-through cache coherency protocol. If the write-through cache contains a data element in the shared or exclusive state, it will drive the SH# signal 268 in a similar manner to the write-back cache complex.

Figure 3:
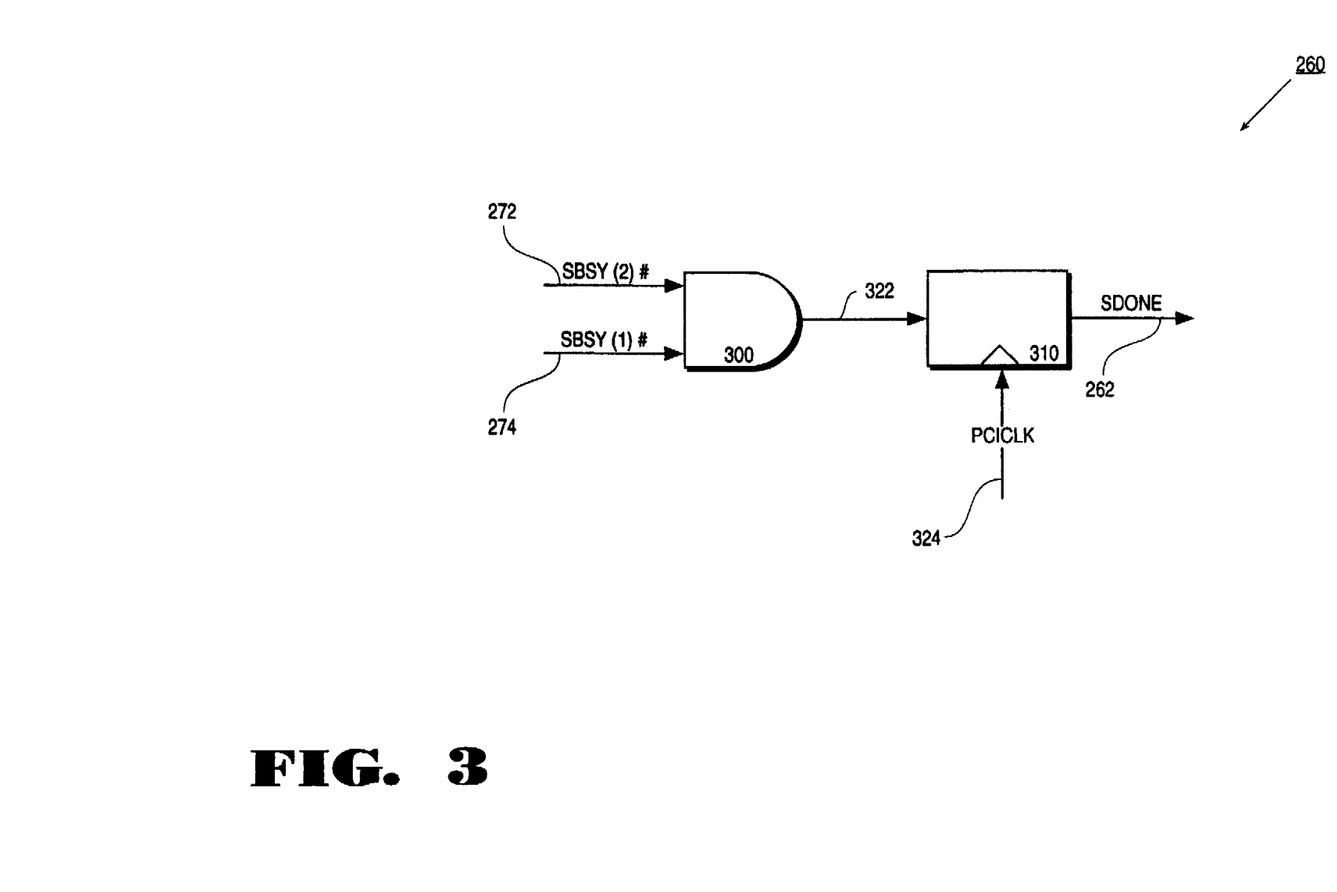
FIG. 3 is a circuit diagram of a snoop busy detection circuit.

As mentioned above, the cache complexes 210 and 220 assert signals SBSY(1)# on line 274, and SBSY(2)# on line 272. These signals are fed into the detection circuitry 260, which detects when both of the signals on lines 272 and 274 have been de-asserted. FIG. 3 includes a circuit schematic of the detection circuitry 260. The SBSY(1)# line 274 and SBSY(2)# line 272 are fed into an AND gate 300. Because SBSY(1)# and SBSY(2)# are both active low, a value of logical zero (0) indicates the cache complex 210 or 220 is still busy. When both lines 272 and 274 are logical one (1), indicating that the snooping has been completed by both of the cache complexes 210 and 220, then the AND gate 300 asserts a signal on line 322. This signal in turn is fed into the latch 310, which is clocked by the PCI clock 324. The latch 310 is employed for synchronization, since the PCI bus protocol is synchronized with the rising edge of every PCI clock. When the signal 322 is latched, it is asserted on the SDONE line 262. The signal on SDONE line 262 is then sent to the cache complexes 210 and 220, the memory 250, and the bus master 270, to indicate that the snooping has completed.

Figure 4:
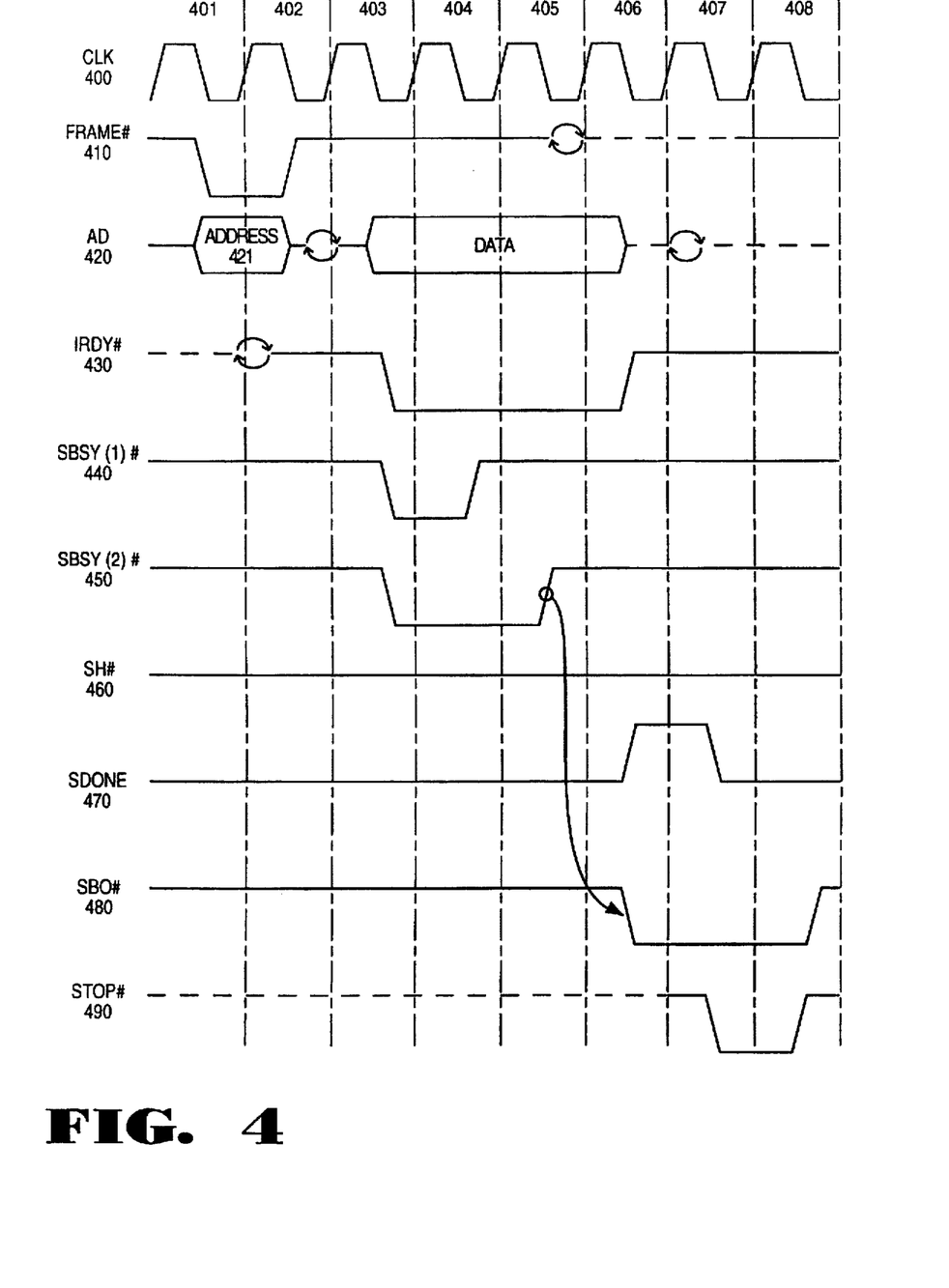
FIG. 4 is a timing diagram of a memory read with a hit to a modified cache line.

FIG. 4 is a timing diagram representing one example of a memory read with a cache hit to a modified line. Each of the signals in FIG. 4 is active on the rising edge of the PCI clock 400. Therefore, each clock period will separately be examined to illustrate the timing and synchronization of the relevant signals.

The timing diagram of FIG. 4 will be explained with reference to the computer system of FIG. 2.

During the first PCI clock cycle 401, the FRAME# signal 410 is pulled low to its active state for one clock cycle by the bus master 270. This initiates the read transaction with the memory 250. At the same time, the address 421 on AD 420 is asserted by the bus master 270.

In the next clock, 402, the address 421 is received by the cache complexes 210 and 220, and the memory 250.

During clock 403, the cache complexes snoop the read transaction request by searching for the address 421 in their caches. For the embodiment shown in FIG. 4, the cache complexes employ a write-back or MESI coherency protocol. The cache complex 210 asserts SBSY(1)# 440 by pulling it low during clock 403. At the same time, cache complex 220 asserts SBSY(2)# 450. The signal IRDY# 430 is also pulled low during clock 403, indicating that the bus master is now prepared to accept the requested data from the memory 250.

For the embodiment illustrated in FIG. 4, cache complex 210 completes snooping in one clock. Hence, SBSY(1)# 440 is pulled high in clock 404. In contrast, cache complex 220 takes two clocks to snoop, so SBSY(2)# 450 is pulled high in clock 405.

The detection circuitry 260 detects when SBSY(1)# 440 and SBSY(2)# 450 have both been pulled high, and asserts SDONE 470 in clock 406. For the particular embodiment displayed in FIG. 4, cache complex 220 contains the data element associated with address 421, and it is in the modified state. Hence, in clock 406, cache complex 220 asserts a low signal on SBO# 480 in the clock cycle after SBSY(2)# is de-asserted. The signal SBO# 480 can be pulled low by either of the cache complexes 210 or 220, but recall that only one cache complex, 210 or 220, may have the data in the "modified" or dirty state and hence only one cache complex may drive the SBO# signal 480 at a time. Also in clock 406, the memory 250 detects the assertion of the SBO# signal 480 and the SDONE signal 470 at the same time.

Because the SBO# signal 480 indicates that memory 250 does not contain the latest copy of the data element, the read transaction between the bus master 270 and the memory 250 is not completed as scheduled. The bus master 270 instead acquires the latest version of the data element.

The memory 250 therefore asserts the STOP# signal 490 in clock 407 in order to halt the memory read request from the bus master 270. For one embodiment, when the read transaction has been halted, the modified data element from cache complex 220 is written to memory 250 and subsequently the bus master 270 re-initiates the read request from the memory 250. Alternative embodiments use other methods of passing the latest copy of the data element from the cache complex 220 to the bus master 270 and updating the memory 250.

Figure 5:
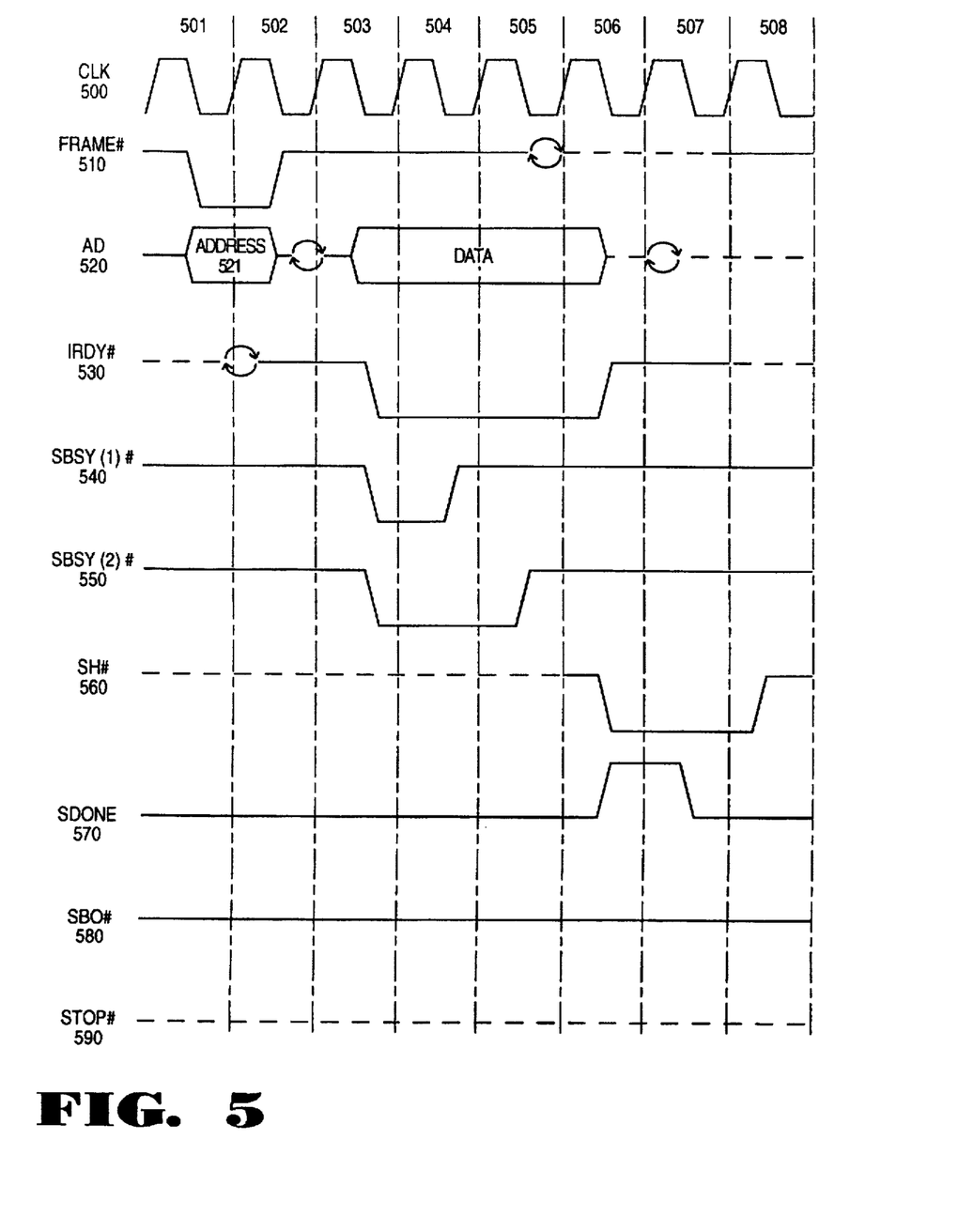
FIG. 5 is a timing diagram of a memory read with a hit to a shared or exclusive cache line.

FIG. 5 illustrates a timing diagram of a memory read transaction request with a hit to an exclusive or shared line. The diagram of FIG. 5 will be explained with reference to the computer system of FIG. 2.

The bus master 270 requests a memory read by using the same steps as in FIG. 4. Therefore, the timing diagram of FIG. 5 for clocks 501–505 is identical to the timing diagram of FIG. 4 for clocks 401–405. For the embodiment shown in FIG. 5, cache complex 220 contains the data element associated with address 521 in the exclusive state. The exclusive state indicates that the data element in cache complex 220 is the same as the copy kept in the memory 250. The timing diagram of FIG. 5 looks the same for the case where the data element within cache complex 220 is in the shared state.

In clock 506, the SDONE signal 570 is asserted to signify that the cache complexes 210 and 220 have finished snooping. At the same time, SH# 560 is asserted, or pulled low, by cache complex 220.

The bus master 270 detects the simultaneous assertion of SH# 560 and SDONE 570 in clock 507. For an embodiment of the invention, the bus master 270 contains a cache employing a write-back or MESI coherency protocol. For this embodiment, the simultaneous assertion of SH# 560 and SDONE 570 alerts the bus master 270 that it should place the data element read from memory 250 in the shared state within the bus master's cache.

In the transaction shown in FIG. 5, the read request does not need to be halted as in the transaction shown in FIG. 4. Therefore, the SBO# signal 580 and STOP# signal 590 are not asserted.

For an alternative embodiment of the invention, bus master 270 does not have a cache. Therefore, the SH# signal 560 is not monitored by the bus master 270. For yet another embodiment, the bus master 270 contains a cache employing a coherency protocol that does not include a shared state. Once again, the bus master 270 is not required to monitor the SH# signal 560.

Thus, in the foregoing detailed description a computer system and method of maintaining cache coherency in a multi-processor system across a local peripheral bus have been described. The computer system described may employ a PCI bus, or other types of local busses for communication between cache complexes. The computer system may contain an unlimited plurality of caching complexes, employing various cache coherency protocols. Moreover, the computer system described may employ a plurality of system memory devices coupled to the local bus.

The method described allows the cache complexes to maintain cache coherency between the plurality of cache complexes and system memory devices coupled to the local bus.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer system comprising:
   a local bus;
   a plurality of caches coupled to the local bus, at least one of which is a write-back cache;
   a main memory coupled to the local bus;
   at least one processor coupled to the local bus;
   a bus master coupled to the local bus, wherein a cache of the plurality of caches is operable to generate a plurality of signals which include:
      a shared signal generated in response to a data element that is snooped on the first local bus being present in the cache; and
      a snoop-busy signal that is active when the cache is in the process of searching for the data element being snooped on the local bus; and
   a circuit directly coupled to each of the multiple caches that receives the snoop-busy signal from each of the multiple caches and transmits a done signal on the local bus in response.

2. The apparatus of claim 1, wherein the local bus is a peripheral component interface (PCI) bus that operates according to a protocol.

3. The apparatus of claim 2, wherein the done signal is a snoop-done (SDONE) signal transmitted to each of the multiple caches and to a main memory.

4. The apparatus of claim 1, wherein the cache stores a set of status bits for each data element in the cache, including a modified bit, an exclusive bit, a shared bit, and an invalid bit.

5. The apparatus of claim 4, wherein, in response to the data element being found in an exclusive status, the cache asserts the shared signal to a bus master that initiated the snoop and changes an associated set of status bits to indicate that the data element has a shared status.

6. The apparatus of claim 4, wherein, in response to the data element being found during a snoop in a modified state, the cache asserts a snoop back off (SBO) signal according to the protocol to a main memory and initiates a write back of the data element to the main memory.

7. A method for operating multiple caches coupled to a local bus in a computer system, including at least one write-back cache, comprising the steps of:
   performing a snoop operation, wherein a bus master component initiates a search for a data element in each of the multiple caches;
   transmitting a shared signal from each of the multiple caches to the bus master in response to the data element being found in the cache;
   asserting a snoop busy signal for each of the multiple caches that is searching for a data element;
   sensing a snoop busy signal from the multiple caches; and
   transmitting a snoop done (SDONE) signal to each of caches and to the bus master in response to the states of the snoop busy signals.

8. The method of claim 7, wherein the shared signal is transmitted from more than one cache at one time over a single line.

9. The method of claim 8, further comprising the steps of:
   storing a plurality of data elements in the multiple caches with a set of status bits for each data element;
   changing the state of a set of status bits associated with a data element according to the shared signal;
   asserting the shared signal in response to the status bits indicating that the data element is present in the multiple caches in an unmodified state; and asserting a signal to initiate a write back of the data element to a main memory in response to the status bits indicating that the data element is present in the multiple caches in a modified state.

10. The method of claim 9, wherein the set of status bits comprises modified, exclusive, shared, invalid (MESI) bits, and wherein the local bus is a peripheral component interface (PCI) bus.

11. The method of claim 10, wherein the signal to initiate a write back is a snoop back off (SBO) signal.

12. The method of claim 11, wherein, if the data element is found in the multiple caches in an exclusive state, the shared signal is asserted and the state of the set of status bits is changed to indicate that the data element is shared.

* * * * *